United States Patent
Meinds

(10) Patent No.: US 6,697,077 B2
(45) Date of Patent: Feb. 24, 2004

(54) METHOD AND APPARATUS FOR COMPUTING A COMPUTER GRAPHICS IMAGE

(75) Inventor: Kornelis Meinds, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 290 days.

(21) Appl. No.: 09/864,142

(22) Filed: May 24, 2001

(65) Prior Publication Data

US 2002/0000992 A1 Jan. 3, 2002

(30) Foreign Application Priority Data

May 30, 2000 (EP) ............................................. 00201908

(51) Int. Cl.[7] ................................................. G09G 5/00
(52) U.S. Cl. ....................... 345/582; 345/586; 345/643; 345/502; 345/505
(58) Field of Search ................................ 345/582, 586, 345/643, 502, 505

(56) References Cited

U.S. PATENT DOCUMENTS

| | | | | |
|---|---|---|---|---|
| 5,553,160 A | * | 9/1996 | Dawson | 382/166 |
| 5,977,983 A | | 11/1999 | Einkauf et al. | 345/430 |
| 6,008,815 A | * | 12/1999 | Levison | 345/428 |
| 6,426,760 B1 | * | 7/2002 | Takahashi | 345/788 |

* cited by examiner

*Primary Examiner*—Matthew C. Bella
*Assistant Examiner*—Tam Tran
(74) *Attorney, Agent, or Firm*—Aaron Waxler

(57) ABSTRACT

A polygon that is made visible in an image. A selection is made between a first and second algorithm for computing a visual effect of the polygon. The first algorithm computes an update value for the polygon and pixel values for spatially successive pixels in the polygon by successively updating the pixel values using the update value. The second algorithm computes the pixel values for each pixel in the polygon individually, without said updating, the first algorithm being selected if the size of the polygon exceeds a threshold, the second algorithm being selected if the polygon size does not exceed the threshold.

17 Claims, 1 Drawing Sheet

METHOD AND APPARATUS FOR COMPUTING A COMPUTER GRAPHICS IMAGE

BACKGROUND OF THE INVENTION

This invention relates to a method of computing an image from a computer graphics model described by at least one polygon that is visible in the image.

In known computer graphics models rendering of objects involves processing polygons (usually triangles) and their visual properties. Each polygon covers a number of pixels in the image. The computation of the image involves the determination which pixels are covered by the polygon and the determination of the visual properties of those pixels from the visual properties of the polygon.

A pixel-based algorithm is conceptually the simplest way of performing this computation. In a pixel based algorithm the computation of the visual properties of each pixel is computed independently of the other pixels. In an example of such a pixel based algorithm the polygon is described by the parameters of its edges and a parameterized function that describes its visual appearance as a function of position in the polygon. In this example a measure of the position of each pixel relative (e.g. left/right) to the different edges of the polygon is computed, to determine whether the pixel is inside or outside the polygon. The computation of the visual properties may involve for example computation of the coordinates of the pixel in terms of a reference frame relative to the polygon, to compute the value of the parameterized function at the location of the pixel.

Such a pixel-based algorithm involves a considerable amount of computation. For example, the determination of the position of the pixel relative to an edge involves at least one multiplication for each edge.

Incremental algorithms can reduce the required amount of computation. In an incremental algorithm a major part of the computation is performed once in common for a series of spatially adjacent pixels. Only a relatively small amount of incremental computation is required for each individual pixel. For the determination whether a pixel is inside the polygon for example, the measure of the position relative to an edge can be computed by adding an increment to the corresponding measure for an adjacent pixel. The adjacent pixels are processed successively to allow such reuse of computation results. Similarly, the visual properties can be computed incrementally, from a computation result for an adjacent pixel.

Incremental algorithms are more complicated than pixel-based algorithms. The incremental algorithm involves setting up the parameters for the incremental computation in addition to the actual computation for the pixel. In practical computer graphics systems, such as a PC (Personal Computer) for example, dedicated hardware is provided for performing the incrementing part of the incremental algorithm and a multi-purpose processor could be used to compute the set-up parameters to start the incrementation by the dedicated hardware for a particular polygon. The multi-purpose processor can compute the set-up parameters for a polygon in parallel with the incremental computation of the properties of individual pixels of a previous polygon by the dedicated hardware. Thus very efficient processing of computer graphics can be realized.

Yet there is still a demand to reduce the amount of computation needed for computer graphics. U.S. Pat. No. 5,977,983 for example proposes to reduce the amount of computation at the expense of image quality, with an algorithm that minimizes the loss of image quality. This publication is directed at texture mapping, which involves a perspective transformation of pixel coordinates to coordinates on the surface of a polygon. A perspective transformation requires a lot of computation (typically including a division), but omission of the perspective transformation leads to a deformation of the resulting image. This deformation is smaller for small polygons. According to U.S. Pat. No. 5,977,983 the perspective transformation is omitted for polygons with a size that is below a threshold. Thus, the deformation is minimized because it applies only to the smaller polygons. The threshold is selected interactively so the compromise between computational effort and image quality can be adjusted.

SUMMARY OF THE INVENTION

Amongst others, it is an object of the invention to provide for a reduction of the amount of computational effort required for computer graphics that is independent of image quality.

The method according to the invention is described in claim 1. According to the invention small polygons are processed with a pixel-based algorithm, whereas larger polygons are processed with an incremental algorithm. Thus, the computational overhead for initializing update values for use in updating pixel values algorithm is avoided for small polygons, where the number of pixels is so small that reduction in the amount of computation per pixel does not weigh up to this overhead. In that case, a pixel value that would be computed incrementally from a corresponding pixel value for a spatially adjacent pixel if the incremental algorithm were used, is computed individually without updating the corresponding pixel value of the adjacent pixel. The incremental algorithm is only used when it is estimated that the polygon is so large that the incremental algorithm realizes a gain.

In an embodiment of the invention, the incremental algorithm and the pixel-based algorithm are executed with a mutually different first and second processor respectively, so that they can be executed in parallel. Preferably, the second processing circuit that performs the pixel-based algorithm also takes the decision whether a polygon is sufficiently large to use the incremental algorithm and it also computes the set up for the first processing circuit to performs the incremental algorithm. Usually, the first processing circuit is so fast that the processing time depends mainly on the second processing circuit, unless the polygon is very large.

The first processing circuit selects the pixel-based algorithm if the set-up of the incremental algorithm requires more effort than pixel-based computation of all pixels in the polygon (that is, the additional time needed for computing the individual pixels in the scan line-based algorithm is ignored in this case).

Preferably the processing circuit that performs the pixel-based algorithm is a suitably programmed programmable processor and the processing that performs the scan line-based algorithm is a dedicated processor for performing the incremental algorithm.

BRIEF DESCRIPTION OF THE DRAWINGS

These and other advantageous aspects of the invention will be described in more detail using the following figures.

DESCRIPTION OF THE PREFERRED EMBODIMENTS

Figure 1:
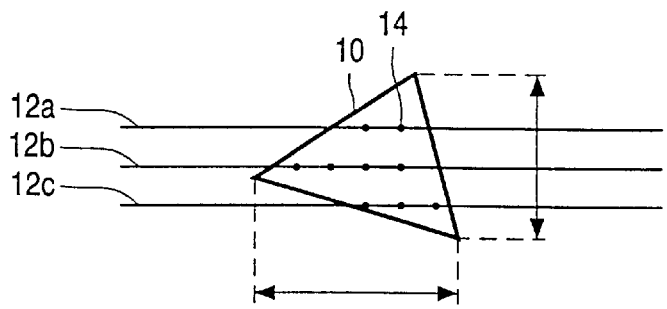
FIG. 1 shows the geometry of a number of pixels in a polygon

FIG. 1 shows a geometry of pixels (e.g. 14) in a polygon 10. The pixels are part of an image for display on a raster display device. The pixels are arranged in the image on scan lines 12a–c. When a polygon 10 is shown in the image, it covers a number of pixels (e.g. 14). In a computer graphics program for computing the image, the program computes which of the pixels are covered by the polygon and it computes the visual properties of these pixels from parameters of the polygon.

For this computation one can use a pixel based algorithm or an incremental algorithm.

A simple example of such a computation (used here for illustrating the basic concepts only) is the determination whether a pixel is within the polygon. A pixel is within a polygon if a number of inequalities is met:

$$ax_i*X+ay_i*Y<C_i$$

Here X, Y are the coordinate values of the pixel, ax, ay for i=0, 1, 2 depend on the slope of the edges of the polygon 10 and C depends on the position of those edges.

In a pixel-based algorithm, these inequalities would be tested for every pixel separately, for example by performing the multiplications with the pixel coordinates that occur in the inequality.

In an example of an incremental algorithm one uses the fact the pixels along a scan line 12a–c have the same Y coordinate and a fixed difference between the X coordinates of adjacent pixels. Thus, if one knows $$S=ax_i*X+ay_i*Y$$

for a pixel with coordinates X, Y, then a corresponding value S' of S for the adjacent pixel with coordinates X+h, Y can be computed from $$S'=S+ax_i*h$$

That is, S' can be computed by adding a coordinate independent update value. The incremental algorithm uses this by first computing the update value and a value of S for the first pixel on each scan line. Subsequently, S is computed successively for a sequence of pixels along a scan line 12a–c, each time by adding the update value. Thus, the amount of computation required per pixel is reduced.

Figure 2:
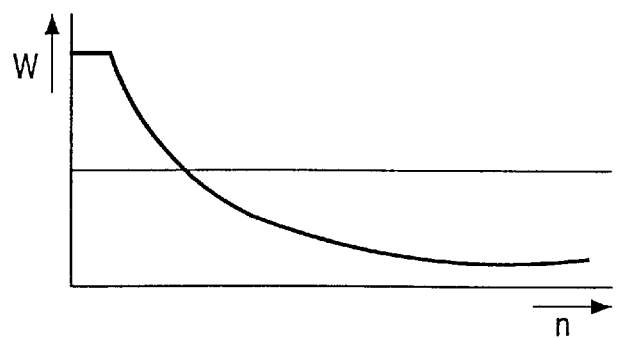
FIG. 2 shows the computational effort required by an incremental algorithm as a function of the number of pixels in a polygon

FIG. 2 shows an illustrative graph 20 of the amount of computation W (expressed e.g. the total computation time) averaged per pixel as a function of the number of pixels for which the computation is performed, for an incremental algorithm. For large numbers of pixels this amount of computation approaches the amount of computation needed for the updating. For small numbers of pixels, the computation needed for computing the update value, which needs to be performed only once for a scan line 12a–c, is still visible.

Of course, this particular incremental algorithm is only a simple example, shown more for illustrative purposes than for its practical use. Other incremental algorithms may be used for example for position dependent shading of the polygon, texture mapping computation of reflections etc. Also the notion of incremental algorithms is not limited to incremental algorithms that compute the update value per scan line. The invention is expressly also directed at algorithms that computes the update value once per polygon, i.e. for any scan lines included in the polygon, which may be two or more scan lines.

Generally, in an incremental algorithm a pixel value for a pixel is obtained by updating the corresponding pixel value of an adjacent pixel. Updating here means using the corresponding pixel value as an operand in the computation of the pixel value, either in an addition (as in the example) or in a more complicated numerical operation. The pixel value may be the actual color value or intensity value of the image at the position of the pixel, but it may also be an intermediate value for use in the computation of that color or intensity value, such as a texture mapping coordinate for example. In addition to the updating, the incremental algorithm involves the initial computation of an update value. As a result, the dependence of the amount of computation needed per pixel on the number of pixels is qualitatively similar to the graph shown in FIG. 2.

For all incremental algorithms there are also alternative pixel-based algorithms, in which the pixel value that is computed by updating in the incremental algorithm is computed without updating. The term "pixel based algorithm" as used herein refers to the computation of this pixel value. It does not exclude the possibility that parts of the pixel based algorithm, which compute other parameters than this pixel value, use an incremental algorithm for computing those other parameters.

In a pixel-based algorithm a fixed amount of computation per pixel is required to compute that pixel value. In terms of the graph of FIG. 2, the graph for a pixel-based algorithm would therefore be a horizontal line, with a vertical position corresponding to the amount of computation per pixel. Generally, this amount is much larger than the amount of computation required to do the updating in an incremental algorithm. Therefore, the prior art has generally favored the use of incremental algorithms. However, in a pixel-based algorithm there is no overhead for computing an update value. As a result, the amount of computation for a small number of pixels may actually be smaller than that needed for an incremental algorithm.

The invention makes use of this by adapting the choice of the algorithm used to compute pixel values to the size of the polygon that is being processed. If the number of pixels in the polygon is so small that it is expected that the amount (e.g. time) of computation for computing the pixel values for those pixels with a pixel-based algorithm is smaller than the amount of computation needed for the incremental algorithm, the pixel based algorithm is used. Otherwise the incremental algorithm is used. In practice the selection between the algorithms may be made for example by comparing the area of the triangle, or the maximum of its width and height, with a threshold indicative of the area or width or height for which the incremental algorithm and the pixel based algorithm require an approximately equal amount of time. Of course, it may be that such an approximated way of choosing the algorithm occasionally leads to selection of a slower algorithm, but this leads only to a small loss in efficiency, since the fastest algorithm is selection when there is a substantial difference between the speeds of the algorithms.

Figure 3:
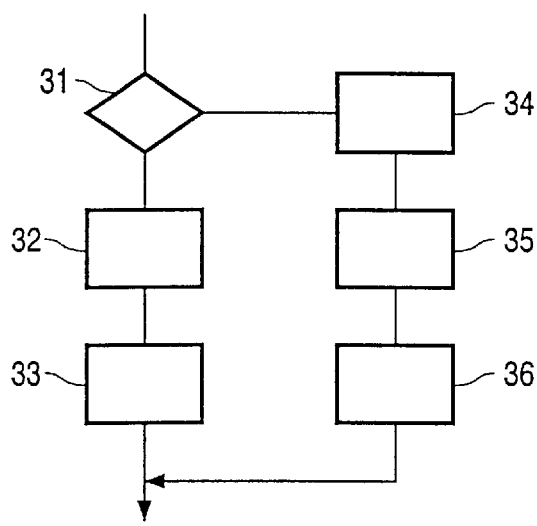
FIG. 3 shows a flow chart of a program for processing a polygon

FIG. 3 shows a flow-chart of a computer graphics program for processing a polygon according to the invention. In a first step 31, the size of the polygon is compared with a threshold. If the size does not exceed the threshold a second and third step 32, 33 are executed, otherwise a fourth, fifth and sixth step 34, 35, 36 are executed.

In the first step 31 the comparison of the size of the polygon with the threshold is performed for example by computing the XY dimensions of a bounding box that encloses the polygon and using the product of these dimensions as the size of the polygon in the comparison. But of course this is only an example. One may compare both the X and the Y dimensions with a threshold and execute the first and second step of both are smaller than the threshold. In another example one might use a count of the number of pixels covered by the polygon as the size in the comparison.

The second and third step 32, 33 represent a pixel-based algorithm. In the second step, the pixel value for the pixel is computed individually, that is, without using a corresponding pixel value for another pixel. In the third step 33, it is tested whether all pixels in the polygon have been processed. If not, the second step 32 is repeated for another pixel. Once all pixels have been processed the flow-chart terminates.

The fourth fifth and sixth step 34, 35, 36 represent an incremental algorithm. In the fourth step 34, the update value is computed as well as any other set-up parameters and initial values needed for the incremental algorithm (including, if necessary, the pixel value for an initial pixel. In the fifth step 35, the pixel value is computed for a pixel, by updating the corresponding pixel value for an adjacent pixel. The sixth step 36 tests whether all pixels have been processed. If not, the fifth step 35 is repeated for another pixel. When all pixels have been processed the algorithm terminates.

Figure 4:
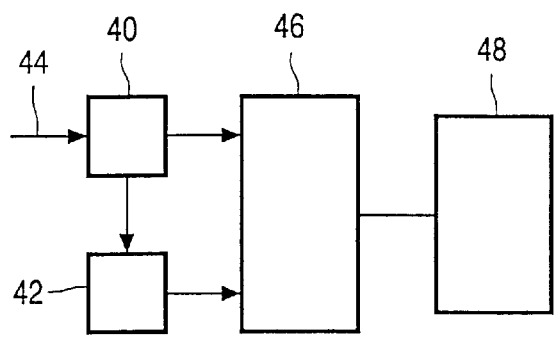
FIG. 4 shows an apparatus for processing a polygon.

FIG. 4 shows an apparatus for computing an image. The apparatus contains a programmable processor 40, a dedicated incremental processor 42, an image memory unit 46 and a display unit 48. The programmable processor 40 has an input 44 for receiving the parameters of a polygon (although an external input is shown, the parameters may in practice also be generated by program running on the processor 40 itself). The programmable processor 40 has outputs coupled to the dedicated incremental processor 42 and the image memory unit 46. The dedicated processor 42 also has an output coupled to image memory 46 unit. Image memory unit 46 has an output coupled to display unit 48.

Dedicated incremental processor 42 is designed specifically to execute a computer graphics function that involves the updating part of an incremental algorithm, for example as part of texture mapping, or as part of a graphics pipeline. Dedicated processor 42 needs set-up parameters and at least one update value to process pixels. Programmable processor 40 computes the set-up parameters and the update value, sends this information to the dedicated processor 42 and signals that dedicated processor 42 to start processing using this information. Dedicated processor 42 writes result for the processed pixels into image memory unit 46. Image memory unit 46 periodically reads these results and sends them to the display unit (for example a CRT or an LCD) for display.

Programmable processor 40 is programmed according to the invention to test the size of the polygons that are to be processed. If the size exceeds a threshold, programmable processor 40 starts computing set-up parameters and update value for dedicated processor, in order to cause the dedicated processor 42 to computed the pixel values using an incremental algorithm. If the size does not exceed the threshold, programmable processor 42 computes the pixel values itself for the pixels covered by the polygon, using a pixel-based algorithm, thereby saving computing time by not computing an update value. Programmable processor 40 writes the result of this processing into image memory unit 46 at memory locations where otherwise the results would be written that would be produced for the pixels of the polygon by dedicated processor 42.

The threshold is selected so that the polygon is processed with the pixel based algorithm instead of the incremental algorithm if the time needed for the set-up calculations for the incremental algorithm plus the time needed for computing the pixel values of the polygon with the incremental algorithm is larger than the time needed to compute those pixel values with the pixel based algorithm on the dedicated processor 42. In setting the threshold, one should take account of the fact whether dedicated processor 42 operates in parallel with programmable processor 40, and whether processing of different polygons may be pipelined. For example, in case of pipelining it may be that total processing time for small polygons depends only on the time needed by programmable processor 40, because dedicated processor 42 is so fast that its processing does not contribute to the time-critical processing path for small polygons. In this case, the threshold should be set at the size at which pixel based processing in programmable processor takes as much time as preparing the initial set-up of dedicated processor 42.

What is claimed is:

1. A method of computing an image from a computer graphics model that describes at least one polygon that is visible in the image, the method comprising, selecting between a first and second algorithm for computing a visual effect of the polygon, wherein the first algorithm computes an update value for the polygon and pixel values for spatially successive pixels in the polygon by successively updating the pixel values using the update value, and wherein the second algorithm computes said pixel values for each pixel in the polygon individually, without said updating, selecting the first algorithm if a size of the polygon exceeds a threshold, and selecting the second algorithm if the size of the polygon does not exceed the threshold.

2. A method according to claim 1, the method being executed with a computing device that comprises a first processing circuit and a second processing circuit, wherein a circuit of the first processing circuit is dedicated to executing the updating according to the first algorithm, the second processing circuit being a general purpose processor, programmed to select between the first and second algorithm, to execute the second algorithm if the second algorithm is selected or to compute the update value and to trigger the first processing circuit if the first algorithm is selected.

3. An apparatus for computing an image from a model described by at least one polygon that is visible in the image, the apparatus comprising:

a first processing circuit dedicated to computing pixel values according to a first algorithm that computes pixel values for spatially successive pixels in the polygon by successively updating the pixel values using an update value; and a second processing circuit arranged to compare a size of the polygon with a threshold, the second processing circuit setting up the first processing circuit to compute a visual effect of the polygon on the pixel values when the size exceeds a threshold, the second processing circuit computing the pixel values according to a second algorithm which computes the pixel values for the spatially adjacent pixels individually, without said updating, when the size of the polygon does not exceed the threshold.

4. The method as claimed in claim 1 further comprising:
establishing a threshold size of the polygon prior to the step of selecting between the first and second algorithms.

5. The image computing apparatus as claimed in claim 3 wherein the second processing circuit includes means for deriving the threshold size of the polygon.

6. The image computing apparatus as claimed in claim 3 wherein the polygon is a triangle.

7. An apparatus for computing an image from a model described by at least one polygon that is visible in the image, the apparatus comprising:
- a first processing circuit dedicated to computing pixel values according to a first incremental algorithm that computes pixel values for spatially successive pixel in the polygon by successively updating the pixel values using an update value, and
- a second multipurpose processing circuit comprising;
  - means for deriving a threshold size of the polygon,
  - means for comparing a size of the polygon with the threshold size of the polygon,
  - means for computing a set-up value which is required for the first processing circuit to perform its first incremental algorithm, wherein
    - the second processing circuit supplies the set-up value to the first processing circuit when the comparing means determines that the polygon size exceeds the threshold size of the polygon, whereby the first processing circuit then computes a visual effect of the polygon based on the pixel values and in accordance with the first incremental algorithm, and
    - the second processing circuit computes the pixel values according to a second pixel-based algorithm which computes the pixel values for the spatially adjacent pixels individually, without the use of the update value, when the size of the polygon does not exceed the threshold size of the polygon.

8. The image computing apparatus as claimed in claim 7 wherein the first and second processing circuits are arranged to operate in parallel.

9. The image computing apparatus as claimed in claim 7 wherein the second processing circuit includes means for deriving the up-date value for the first incremental algorithm for the case where the comparing means determines that the polygon size exceeds the threshold size of the polygon.

10. The image computing apparatus as claimed in claim 7 wherein the first incremental algorithm directs the first processing circuit to compute pixel values successively for a sequence of pixels along scan lines by adding the up-date value to each successive pixel value in a scan line.

11. The image computing apparatus as claimed in claim 7 wherein the polygon is a triangle and the selection between the first and second algorithms is made by comparing the area of the triangle polygon with the area of a threshold triangle polygon.

12. The image computing apparatus as claimed in claim 7 wherein the selection between the first and second algorithms is made by comparing a count of a number of pixels included within the polygon to a threshold number of pixels included within a threshold polygon.

13. The computing method and claimed in claim 1 further comprising:
computing set-up parameters and initial pixel values required for the operation of the first algorithm.

14. The computing method as claimed in claim 2 which further comprises,
operating the first and second processing circuits in parallel.

15. The computing method as claimed in claim 1 wherein the selection between the first and second algorithms is done by comparing the size of the polygon to the size of a threshold polygon.

16. The computing method as claimed in claim 15 wherein the comparing step compares on of the following,
- comparing the area of the polygon to the area of the threshold polygon,
- comparing a width or height dimension of the polygon to a width or height dimension of the threshold polygon, and
- comparing a count of the number of pixels encompassed within the polygon to the count of pixels encompassed within the threshold polygon.

17. The computing method as claimed in claim 1 wherein, in operation of the first algorithm, pixel values are computed by updating the pixel values for respective adjacent pixels.

* * * * *